United States Patent
Kunkel

(10) Patent No.: US 8,973,974 B2
(45) Date of Patent: Mar. 10, 2015

(54) AERODYNAMIC REAR FAIRING SYSTEM FOR A TRAILER

(71) Applicant: David P. Kunkel, Lebanon, IN (US)

(72) Inventor: David P. Kunkel, Lebanon, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 14/257,257

(22) Filed: Apr. 21, 2014

(65) Prior Publication Data

US 2014/0319872 A1    Oct. 30, 2014

Related U.S. Application Data

(60) Provisional application No. 61/817,349, filed on Apr. 30, 2013.

(51) Int. Cl.
    *B62D 35/00*    (2006.01)
(52) U.S. Cl.
    CPC ..................... *B62D 35/001* (2013.01)
    USPC ...................................................... 296/180.4
(58) Field of Classification Search
    CPC ........................... B62D 35/00; B62D 35/001
    USPC ................................. 296/180.1, 180.2, 180.4
    See application file for complete search history.

(56) References Cited

U.S. PATENT DOCUMENTS

| | | | |
|---|---|---|---|
| 2,933,344 A | 4/1960 | Shumaker | |
| 3,010,754 A | 11/1961 | Shumaker | |
| 3,276,811 A | 10/1966 | Schmidt | |
| 3,596,975 A | 8/1971 | Stephen | |
| 3,960,402 A | 6/1976 | Keck | |
| 3,999,797 A * | 12/1976 | Kirsch et al. | 296/180.4 |
| 4,142,755 A * | 3/1979 | Keedy | 296/180.2 |
| 4,214,787 A | 7/1980 | Chain | |
| 4,309,053 A | 1/1982 | Lett | |
| 4,316,630 A * | 2/1982 | Evans | 296/180.2 |
| 4,320,920 A | 3/1982 | Goudey | |
| 4,357,045 A | 11/1982 | Kinford, Jr. | |
| 4,417,760 A * | 11/1983 | Koch | 296/180.1 |
| 4,421,354 A | 12/1983 | Lemaster | |
| 4,735,381 A | 4/1988 | Wood | |
| 4,809,003 A | 2/1989 | Dominek et al. | |
| 4,881,772 A | 11/1989 | Feinberg | |
| 5,112,120 A | 5/1992 | Wood | |
| 5,199,762 A | 4/1993 | Scheele et al. | |

(Continued)

FOREIGN PATENT DOCUMENTS

WO    WO/2013/188669    12/2013

OTHER PUBLICATIONS

Aerodynamic Trailer Systems, LLC SmartTail® The Trucking Industry's First Totally Automated Trailer Air Spoiler from www.ats-green.com/smarttail.htm (2pages), Jan. 13, 2014.

(Continued)

*Primary Examiner* — Gregory Blankenship

(57) ABSTRACT

A rear fairing system for reducing drag on a trailer includes a plurality of fairings coupled to a rear, vertical door post of the trailer. Each fairing includes (i) a mounting member adjacent to and engaged with a rearward, outer surface of the vertical door post and (ii) an air deflection member coupled to the mounting member and including a vertical portion and a curved portion which curves inwardly toward a centerline of the trailer. Each fairing is mounted to the door post at a location between hinges of a rear swing door of the trailer.

19 Claims, 4 Drawing Sheets

(56) References Cited

U.S. PATENT DOCUMENTS

| | | | |
|---|---|---|---|
| 5,280,990 A | 1/1994 | Rinard | |
| 5,374,013 A | 12/1994 | Bassett et al. | |
| 5,382,070 A | 1/1995 | Turner | |
| 5,498,059 A | 3/1996 | Switlik | |
| 5,658,038 A * | 8/1997 | Griffin | 296/180.2 |
| 5,823,610 A * | 10/1998 | Ryan et al. | 296/180.4 |
| 5,901,925 A | 5/1999 | McGrath et al. | |
| 5,901,929 A | 5/1999 | Banks et al. | |
| 6,131,853 A | 10/2000 | Bauer et al. | |
| 6,241,302 B1 | 6/2001 | Rehkopf | |
| 6,257,654 B1 * | 7/2001 | Boivin et al. | 296/180.5 |
| 6,286,892 B1 | 9/2001 | Bauer et al. | |
| 6,485,087 B1 | 11/2002 | Roberge et al. | |
| 6,616,218 B2 | 9/2003 | Bauer et al. | |
| 6,666,498 B1 * | 12/2003 | Whitten | 296/180.4 |
| 6,685,256 B1 | 2/2004 | Shermer | |
| 6,742,616 B2 | 6/2004 | Leban | |
| 6,799,791 B2 * | 10/2004 | Reiman et al. | 296/180.1 |
| 6,854,788 B1 * | 2/2005 | Graham | 296/180.4 |
| 6,959,958 B2 | 11/2005 | Basford | |
| 6,986,544 B2 | 1/2006 | Wood | |
| 7,008,005 B1 | 3/2006 | Graham | |
| 7,207,620 B2 | 4/2007 | Cosgrove et al. | |
| 7,240,958 B2 | 7/2007 | Skopic | |
| 7,255,387 B2 | 8/2007 | Wood | |
| 7,318,620 B2 | 1/2008 | Wood | |
| 7,431,381 B2 | 10/2008 | Wood | |
| 7,537,270 B2 | 5/2009 | O'Grady | |
| 7,585,015 B2 * | 9/2009 | Wood | 296/180.4 |
| 7,625,034 B1 | 12/2009 | Fitzgerald | |
| 7,641,262 B2 | 1/2010 | Nusbaum | |
| 7,740,304 B1 * | 6/2010 | Breu | 296/180.4 |
| 7,748,771 B2 * | 7/2010 | Distel et al. | 296/180.4 |
| 7,837,254 B2 * | 11/2010 | Reiman et al. | 296/180.4 |
| 7,850,224 B2 | 12/2010 | Breidenbach | |
| 7,854,468 B2 | 12/2010 | Vogel et al. | |
| 7,862,102 B1 | 1/2011 | Benton | |
| 7,950,720 B2 | 5/2011 | Skopic | |
| 7,976,096 B2 * | 7/2011 | Holubar | 296/180.1 |
| 8,007,030 B2 * | 8/2011 | Wood | 296/180.4 |
| 8,025,329 B1 | 9/2011 | Kron | |
| 8,025,330 B2 * | 9/2011 | Reiman et al. | 296/180.4 |
| 8,033,594 B2 * | 10/2011 | Nusbaum | 296/180.4 |
| 8,091,951 B1 | 1/2012 | Fitzgerald | |
| 8,100,461 B2 | 1/2012 | Smith et al. | |
| 8,136,868 B2 | 3/2012 | Nusbaum | |
| 8,177,287 B2 | 5/2012 | Vogel et al. | |
| 8,196,994 B2 * | 6/2012 | Chen | 296/180.4 |
| 8,196,995 B2 * | 6/2012 | Chen | 296/180.4 |
| 8,235,456 B2 | 8/2012 | Nusbaum | |
| 8,251,436 B2 * | 8/2012 | Henderson et al. | 296/180.4 |
| 8,272,680 B2 | 9/2012 | Breidenbach | |
| 8,303,025 B2 | 11/2012 | Senatro | |
| 8,342,594 B2 | 1/2013 | Benton | |
| 8,342,595 B2 * | 1/2013 | Henderon et al. | 296/180.4 |
| 8,360,507 B2 | 1/2013 | Benton | |
| 8,360,509 B2 | 1/2013 | Smith et al. | |
| 8,360,510 B2 | 1/2013 | Smith et al. | |
| 8,382,194 B2 * | 2/2013 | Wood | 296/180.4 |
| 8,480,161 B2 * | 7/2013 | Pfaff | 296/180.4 |
| 8,480,162 B2 | 7/2013 | Breidenbach | |
| 8,491,036 B2 * | 7/2013 | Henderson et al. | 296/180.4 |
| 8,579,357 B2 * | 11/2013 | Nusbaum | 296/180.1 |
| 8,608,228 B2 | 12/2013 | Visentin | |
| 8,672,391 B1 * | 3/2014 | Cobb | 296/180.4 |
| 8,684,447 B2 * | 4/2014 | Henderson et al. | 296/180.4 |
| 8,697,047 B2 * | 4/2014 | Le Buannec et al. | 424/85.5 |
| 8,708,399 B2 * | 4/2014 | Smith et al. | 296/180.4 |
| 8,746,779 B1 * | 6/2014 | Mazyan | 296/180.2 |
| 8,770,650 B1 * | 7/2014 | Brosseau | 296/180.5 |
| 8,777,297 B2 * | 7/2014 | Meredith et al. | 296/180.4 |
| 8,783,757 B2 * | 7/2014 | Henderson et al. | 296/180.4 |
| 2008/0116715 A1 | 5/2008 | Steel | |
| 2008/0157560 A1 | 7/2008 | Spector | |
| 2009/0236872 A1 * | 9/2009 | Wood | 296/180.1 |
| 2010/0106380 A1 | 4/2010 | Salari et al. | |
| 2010/0194144 A1 | 8/2010 | Sinha | |
| 2011/0115254 A1 | 5/2011 | Skopic | |
| 2012/0126572 A1 * | 5/2012 | Hjelm et al. | 296/180.1 |
| 2012/0292945 A1 | 11/2012 | Nusbaum | |
| 2013/0076063 A1 * | 3/2013 | Ryan et al. | 296/180.1 |
| 2013/0076064 A1 * | 3/2013 | Smith et al. | 296/180.1 |
| 2013/0106136 A1 | 5/2013 | Smith et al. | |
| 2013/0175824 A1 | 7/2013 | Smith et al. | |
| 2013/0214557 A1 | 8/2013 | Smith et al. | |
| 2014/0019010 A1 | 1/2014 | Smith et al. | |
| 2014/0117713 A1 | 5/2014 | Baker | |

OTHER PUBLICATIONS

Kodiak Innovations—"Bumper Bullet" from www.slipstreemaero.com (2 pages), Jan. 13, 2014.

Aerovolution—Revolutionary Inflatable Aerodynamic Solutions from www.aerovolution.com/information.shtml (2 pages), Oct. 13, 2014.

SmartTruck New Product Release: Low Profile Side Fairings Changing the Shape of Trucking, slide show for Mid-America Trucking Show, (7 pages), Mar. 21-23, 2013.

Trailer Fairings Be Road Smart from www.beroadsmart.com/Vortex_Generators-2.html (2 pages), Jan. 9, 2014.

Solus Aero Package from www.solusinc.com/aero.html (2 pages), Jan. 9, 2014.

* cited by examiner

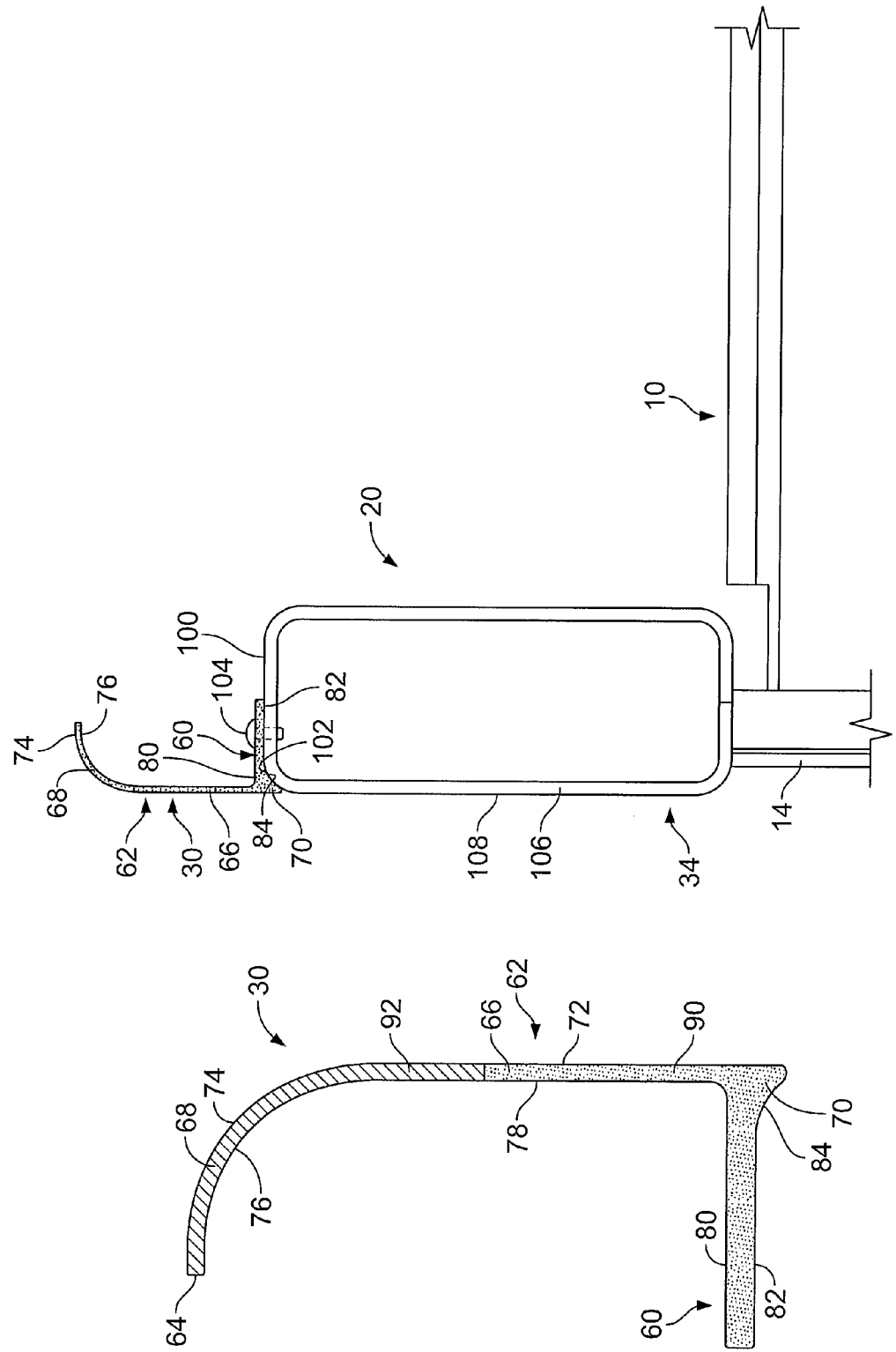

AERODYNAMIC REAR FAIRING SYSTEM FOR A TRAILER

This application claims priority under 35 U.S.C. §119(e) to U.S. Provisional Patent Application Ser. No. 61/817,349 entitled AERODYNAMIC REAR FAIRING SYSTEM FOR A TRAILER and filed Apr. 30, 2013, the entirety of which is hereby incorporated by reference herein.

FIELD OF THE INVENTION

The present invention relates generally to semi-trailers, such as van-type trailers, for example. In particular, the present invention relates to an aerodynamic rear fairing system for reducing drag on such a trailer.

BACKGROUND OF THE INVENTION

To reduce wind flow resistance and drag on a trailer, truck, semitrailer, or other vehicle, rear tail assemblies and/or rear fairing assemblies have been used which are generally attached to the rear end of the trailer to extend rearwardly in order contour the airflow behind the trailer. Typically, a rear fairing or trailer tail assembly for a trailer may be attached to the rear end assembly of the trailer, a rear portion of the sidewalls of the trailers, and/or to the rear door of the trailer.

Air flow passing around the rear end of a ground vehicle, i.e., the wake flow, is characterized as unsteady and dynamic and thus imparts a drag force to the vehicle. Rear trailer fairing assemblies are designed to control the flow of air around the rear end of the trailer. Such reduction on the drag of the trailer may operate to conserve fossil fuels as well as other sources of vehicle drive power for hybrid vehicles, battery-operated vehicles, and alternative fuel-based vehicles, for example.

SUMMARY

The present invention may comprise one or more of the features recited in the attached claims, and/or one or more of the following features and combinations thereof.

According to one aspect of the present disclosure, a rear fairing system for reducing drag on a trailer having a rear swing door includes a fairing configured to be coupled to a rear, vertical door post of the trailer. The fairing includes (i) a mounting member configured to lie adjacent to and engaged with a rearwardly-facing, outer surface of the vertical door post and (ii) an air deflection member coupled to the mounting member and including a vertical portion and a curved portion.

In one illustrative embodiment, the curved portion may curve inwardly toward a longitudinal centerline of the trailer.

In another illustrative embodiment, the fairing may be made of plastic. Illustratively, the fairing may be made of a dual durometer plastic. In particular, the mounting member may be made of a first plastic and the curved portion of the air deflection member may be made of a second plastic. Illustratively, the first plastic may be less flexible than the second plastic.

In still another illustrative embodiment, the rear fairing system may also include a plurality of fairings configured to be coupled to the rear, vertical door post of the trailer. Illustratively, each fairing may be configured to be positioned between a pair of hinge butts of the trailer that are coupled to the vertical door post of the trailer and to a swing door panel of the trailer. Further illustratively, a profile of the air deflection member of the fairing may be substantially similar to an outer surface of the profile of the hinge butt. Alternatively, the air deflection member of the fairing may be configured to extend rearwardly beyond a rearward edge of the hinge butt.

In yet another illustrative embodiment, the fairing may be riveted to the door post. Alternatively, or in addition to the rivet, the rear fairing system may additionally include an adhesive coupled to an outer surface of the mounting member in order to bond the fairing to the door post.

In still another illustrative embodiment, an outer surface of the air deflection member of the fairing may be generally aligned with an outer surface of the door post.

In yet another illustrative embodiment, the fairing may also include an overhang member coupled to the mounting member and the air deflection member. The overhang member may be configured to lie adjacent to and engaged with a curved outer edge of the rear, vertical door post. Further, the overhang member may extend forwardly from the mounting member and the air deflection member.

According to another aspect of the present disclosure, a rear fairing system for reducing drag on a trailer having a rear swing door includes a plurality of fairings configured to be coupled to the rear vertical door post of the trailer. Each fairing is spaced vertically apart from each other fairing. Further, each fairing is configured to be located within the profile of the rear swing door and operate to substantially fill a gap between spaced-apart hinges of the rear swing door.

In one illustrative embodiment, each fairing may include a mounting member configured to lie adjacent to and engaged with a rearwardly-facing, outer surface of the vertical door post. Each fairing may also include a J-shaped air deflection member coupled to the mounting member and configured to extend rearwardly therefrom. Illustratively, a rearward end portion of the air deflection member of each fairing may curve inwardly toward a longitudinal centerline of the trailer.

In another illustrative embodiment, a length of each fairing may be substantially equivalent to a distance between adjacent, spaced-apart hinges of the rear swing door.

According to yet another aspect of the present disclosure, a rear end assembly of a trailer includes a rear frame and a swing door coupled to the rear frame. The swing door includes a swing door panel and a plurality of spaced-apart hinges coupled to a rear, vertical door post of the rear frame and the swing door panel. The rear end assembly also includes a fairing coupled to the rear, vertical door post at a location between adjacent and spaced-apart hinges in order to substantially fill a gap between the spaced-apart hinged. Illustratively, a rearmost end of the fairing may be substantially aligned with a rearmost end of the hinges.

BRIEF DESCRIPTION OF THE DRAWINGS

FIG. 3 is a sectional view of one of the fairings showing that each fairing is made out of two different materials.

FIG. 4 is a top view of a door post of the rear frame of the trailer showing one of the fairings coupled thereto.

DETAILED DESCRIPTION OF THE PREFERRED EMBODIMENT

For the purposes of promoting an understanding of the principles of the invention, reference will now be made to illustrative embodiments shown in the attached drawings and specific language will be used to describe the same. While the concepts of this disclosure are described in relation to a truck trailer, it will be understood that they are equally applicable to other vehicles generally, and more specifically to conventional flat-bed and/or box or van type trailers, examples of which include, but should not be limited to, straight truck bodies, small personal and/or commercial trailers and the like. Accordingly, those skilled in the art will appreciate that the present invention may be implemented in a number of different applications and embodiments and is not specifically limited in its application to the particular embodiments depicted herein.

Figure 1:
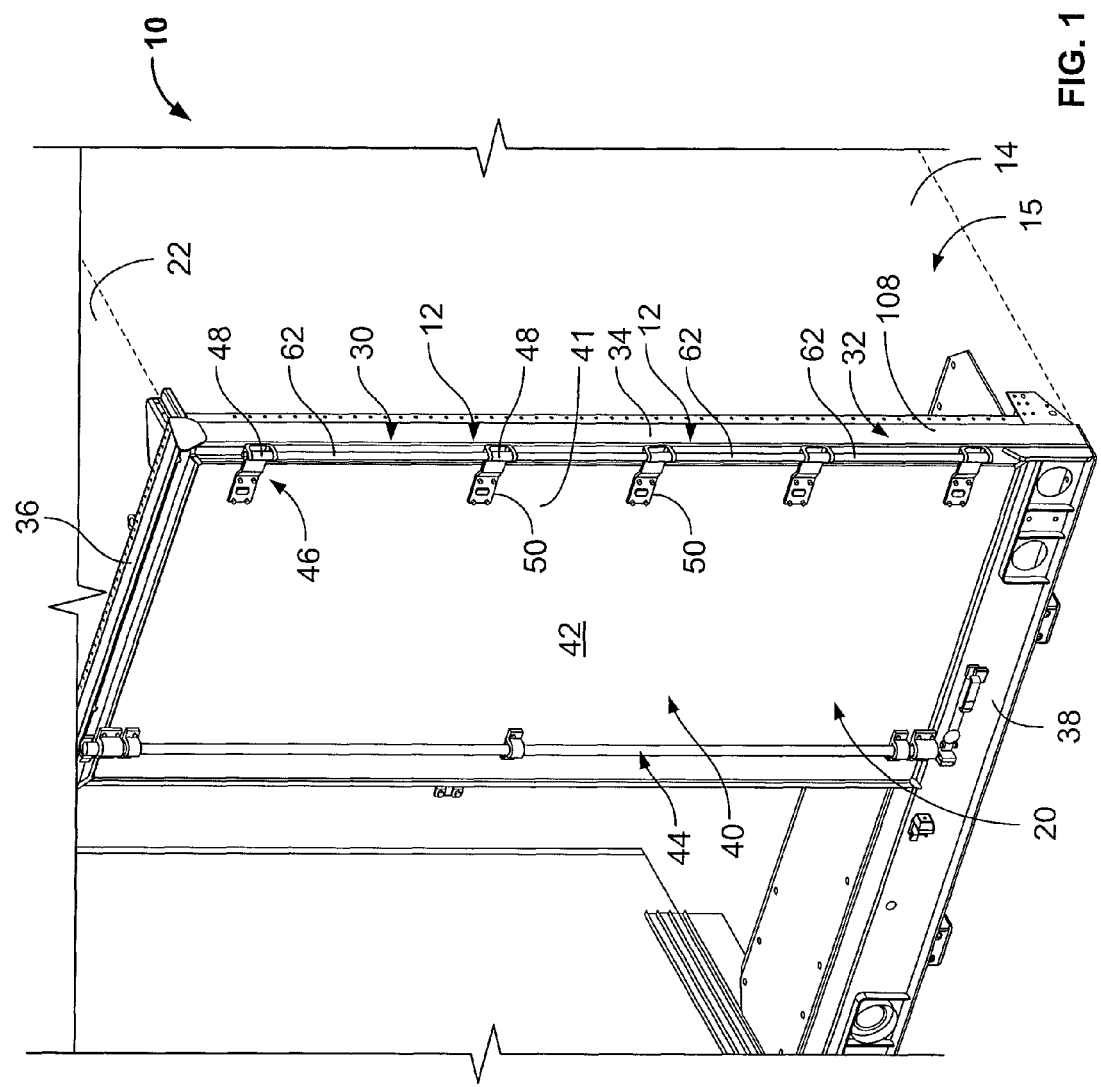
FIG. 1 is a rear perspective view of a portion of a trailer including the aerodynamic rear fairing system coupled to a rear frame of the trailer.

Looking first to FIG. 1, a trailer 10 includes an aerodynamic trailer fairing system 12 coupled to a rear end assembly 20 of the trailer 10. Illustratively, the rear fairing system 12 operates to improve the aerodynamic efficiency of the trailer 10 by redirecting the flow of air at the rear of the trailer in order to reduce the drag on the trailer 10 as the trailer 10 travels down the highway, for example. This redirection of airflow behind the trailer 10 may increase the fuel efficiency, or the efficiency of any other such source of vehicle drive power, of the tractor/trailer combination. Illustratively, the rear fairing system 12 is coupled to the rear end assembly 20 of the trailer 10 and is positioned between door hinges 18 of the rear end assembly 20 of the trailer 10, as shown in FIG. 1.

Illustratively, the trailer 10 includes a storage container 15 configured to carry cargo therein. The storage container 15 includes sidewalls 14, a front end assembly (not shown), a rear end assembly 20, a roof 22, and a floor assembly (not shown) which all cooperate together to define an inside storage portion of the container 15 able to store various articles or goods therein. The trailer 10 further includes a rear wheel assembly, or bogie (not shown), and a front support or landing gear (not shown) each coupled to the floor assembly of the trailer 10. Illustratively, the floor assembly of the trailer 10 includes various laterally-extending cross members and right and left base rails. The front end of the trailer 10 is configured to be coupled to a tractor (not shown) for towing the trailer 10 thereon thus providing a tractor-trailer assembly. It should be understood that while the aerodynamic rear fairing system 12 is shown for use with a trailer 10, the rear fairing system 12 may be coupled to any vehicle to reduce the drag thereon.

Illustratively, the trailer 10 includes two aerodynamic rear fairing systems 12. In particular, one system 12 is coupled one side of the rear end assembly 20 of the storage container 15 of the trailer 10, while the other system 12 is coupled to the other side of the rear end assembly 20 of the storage container 15. For purposes of the description herein, however, only one rear fairing system 12 will be shown and described. However, it should be understood that the two rear fairing systems 12 of the trailer 10 are identical in configuration and function.

Figure 5:
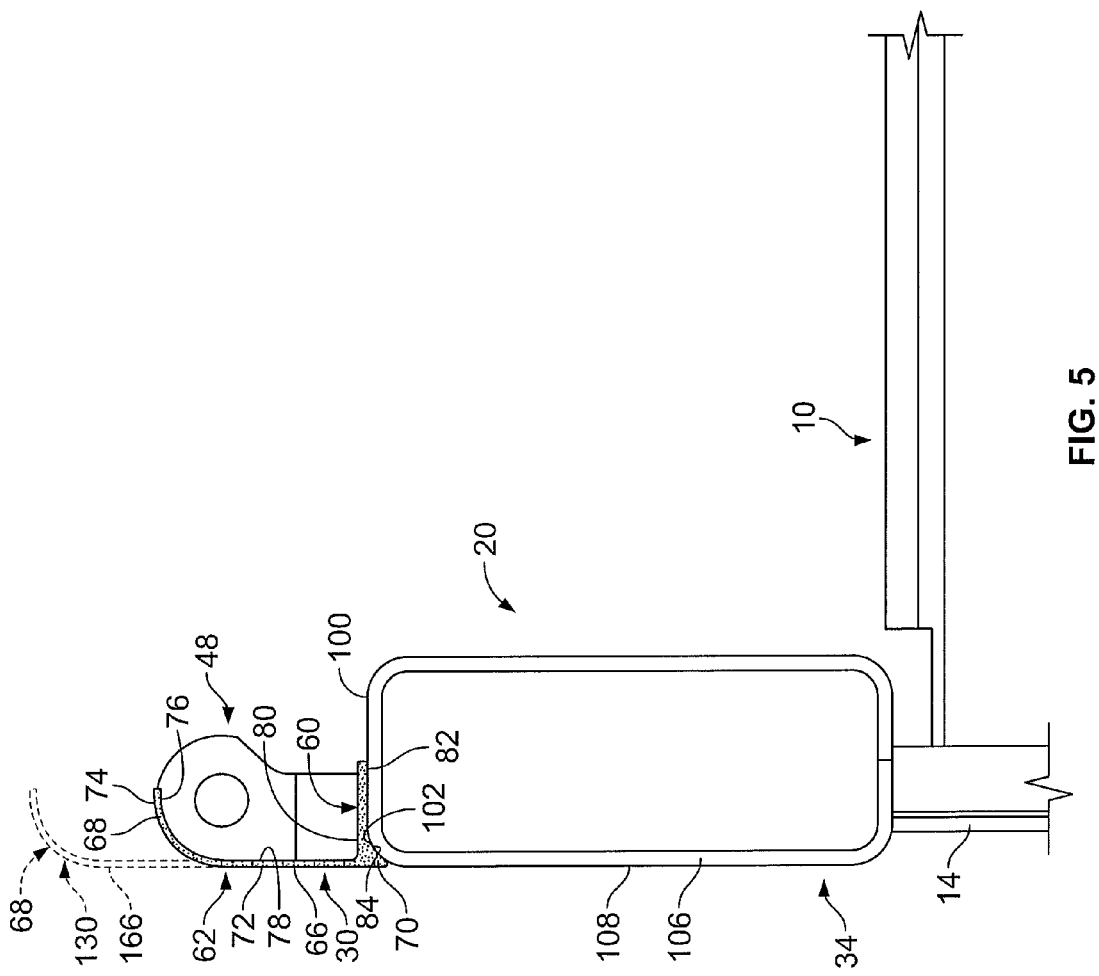
FIG. 5 is a top view of the door post similar to FIG. 4 showing one of the fairings and a hinge butt of a door assembly of the trailer coupled thereto, and also showing (in phantom) an alternative, longer fairing.

As shown in FIG. 1, the rear fairing system 12 includes a plurality of rear fairings 30 coupled to the rear end assembly 20 of the trailer 10. Illustratively, the rear end assembly 20 includes a rear frame 32 including first and second vertical door posts 34, a top frame member 36 extending between the vertical door posts 34, and a bottom frame member 38 extending between the vertical door posts 34. Illustratively, the rear end assembly 20 further includes a rear swing door 40 having first and second door panels 42, and a door lock mechanism 44 coupled to each door panel 42 as well as to the top and bottom frame members 36, 38. Each door panel 42 is coupled to one of the vertical door posts 34 by a plurality of hinges 46. Each hinge 46 includes a hinge butt 48 coupled to one of the door posts 34, as shown in FIG. 5, as well as a hinge plate 50 coupled to the door panel 42. Each hinge butt 48 and hinge plate 50 cooperate to allow the door panels 42 to pivot along a vertical axis parallel to the vertical door post 34 between fully-opened and fully-closed positions. As shown in FIG. 1, each fairing 30 is spaced vertically apart from each other fairing 30 such that a hinge 46 is located between each adjacent fairing 30. Illustratively, a length L of each fairing 30 is substantially equivalent to a distance, or gap, between adjacent and spaced-apart hinges 46 of the rear swing door 40. As such, each fairing 30 operates to substantially fill the gap between the spaced-apart hinges 46 of the rear swing door 40. Illustratively, the door panel 42 shown in FIG. 1 is in the fully-closed position. In the fully-opened position, an outer surface 41 of the door panel 42 may lie adjacent an outer surface of the adjoining side wall 14 of the trailer 10.

Figure 2:
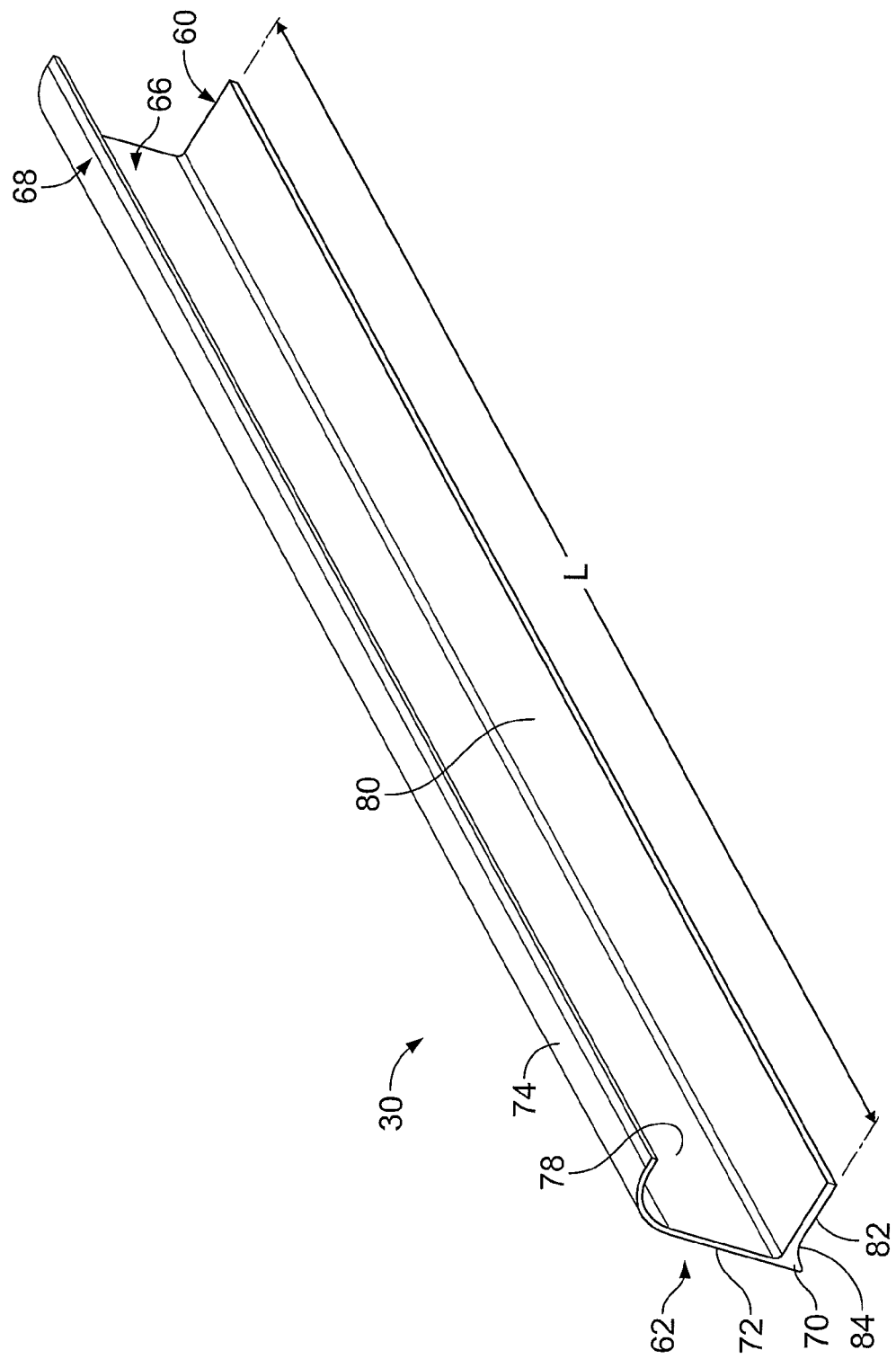
FIG. 2 is a perspective view of one of the plurality of aerodynamic fairings of the rear fairing system.

Each fairing 30 is generally L-shaped when viewed from the end or in cross-section, as shown in FIGS. 2 and 3, and includes a horizontal, mounting member 60 and an air deflection member 62 coupled to one end of the mounting member 60. Illustratively, the mounting member 60 is generally horizontal, and the air deflection member 62 is coupled to the mounting member 60 to extend transversely therefrom in order to define a generally 90 degree angle therebetween. While the particular 90 degree angle is defined between the illustrative members 60, 62, as shown in FIGS. 2 and 3, it should be understood that any suitable angle may be formed between the members 60, 62.

As shown in FIG. 3, the air deflection member 62 is curved at its distal end 64 such that the air deflection member 62 defines a generally straight, or vertical, portion 66 and a curved portion 68. Illustratively, the curved portion 68 curves to the left, as shown in FIG. 3, in the same direction that the mounting member 60 extends away from the air deflection member 62. Accordingly, the curved portion 68 of the air deflection member 62 is positioned above, and spaced-apart from, the mounting member 60. Illustratively, the radius of curvature of the curved portion 68 is approximately 0.625 inches. However, it should be understood that it is within the scope of this disclosure to include a curved portion having any suitable radius of curvature such that the curved portion may actually be straight. Illustratively, the fairing 30 further includes an overhang member 70 extending downwardly from the junction, or corner, formed between the mounting member 60 and the air deflection member 62. When the fairing 30 is mounted to the vertical door post 34, the overhang member 70 extends forwardly from the mounting member 60 and the air deflection member 62.

The mounting member 60, air deflection member 62, and overhang 70 of each fairing 30 cooperate to define various surfaces of the fairing 30. In particular, the vertical portion 66 of the air deflection member 62 and the overhang 72 cooperate to define an outer, vertical surface 72. The curved portion 68 defines an outer curved surface 74 and an inner curved surface 76. The vertical portion 66 of the air deflection member 62 defines an inner surface 78 while the mounting member 60 defines an upper surface 80 and a lower surface 82. The overhang 70 further defines a curved surface 84 congruous with the lower surface 82 of the mounting member 60.

Illustratively, the fairings 30 are each made of a plastic material, such as PVC, for example. Further illustratively, each fairing 30 is extruded from the plastic material to define a one-piece or monolithic, unitary structure. It should be understood that while the fairings 30 described herein are one-piece, such fairings may also be made of multiple components which are subsequently coupled together. Illustratively, each fairing 30 is made of two plastic materials. In particular, each fairing includes a first material 90 and a second material 92, as shown in FIG. 3. As such, the fairings 30 are made of a dual durometer plastic material. The first material 90 is a generally rigid material including, but not limited to a thermoplastic such as polyvinyl chloride (PVC), and having a durometer in the range of 60-100 (shore D). The second material 92 is a material that is more flexible material than the first material 90 including, but not limited to another thermoplastic such as PVC, and having a durometer in the range of 40-90 (shore A).

As shown in FIG. 3, the mounting member 60, the overhang 70, and a lower section of the vertical portion 66 of the air deflection member 62 are made of the first, rigid material 92 while the curved portion 68 and an upper portion of the vertical portion 66 are made of the second, generally flexible material 92. The increased rigidity of the mounting member 60 allows the mounting member 60 to be more securely coupled to the door post 34 of the rear end assembly 20. Further, the greater flexibility of the curved portion 68 of the air deflection member 62 provides an increased resistance to damage in the event that the fairings 30 are caused to impact dock enclosures, for example, and/or are impacted by other things in the surrounding environment. The flexibility of the curved portion 68 allows the curved portion 68 to bend and or deflect when impacted, while also allowing the curved portion 68 to return to its pre-impact shape once free of the structure with which it has been impacted. Illustratively, it should be understood that while the particular fairings 30 disclosed and described herein are made of first and second materials, it is within the scope of this disclosure for the fairings 30 to be made of a single, or homogenous, material as well. Further, while the fairings 30 are illustratively made of one or more plastic materials, it is within the scope of this disclosure to make the fairings 30 from other suitable materials as well, including, but not limited to one or more metals, metal alloys, and/or composite materials.

Figure 6:
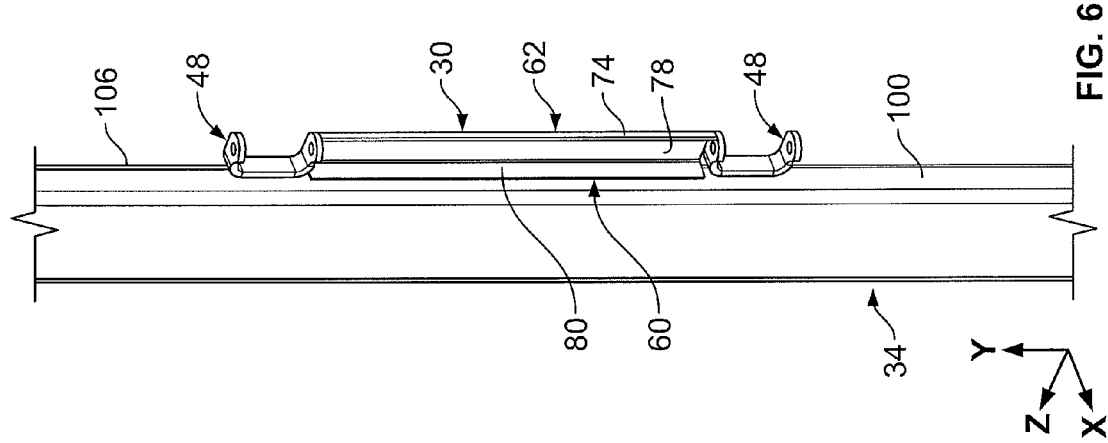
FIG. 6 is a perspective view of the door post showing one of the fairings coupled to the door post and positioned between two hinge butts of the door assembly.

As shown in FIGS. 4-6, the fairings 30 are coupled to the door post 34 such that the lower surface 82 of the mounting member 60 rests on a rearwardly-facing, outer surface 100 of the door post 34. The curved surface 84 of the overhang 70 follows the outer, curved edge 102 of the door post 34 in order to lie flush with the door post 34. Illustratively, the mounting member 60 is coupled to the rear surface 100 of the door post 34 by a plurality of rivets 104 through the mounting member 60 and the rear surface 100 of the door post 34, as shown in FIG. 4. Illustratively, other suitable mechanical fasteners may be used as well, including but not limited to one or more nails, bolts, and screws. Further, an adhesive (not shown) may be used in addition to or in place of the mechanical fastener 104 in order to bond the fairing 30 to the door post 34. Illustratively, the adhesive would be located adjacent the lower surface 82 of the horizontal member 60 and the curved surface 84 of the overhang 70.

As shown in FIG. 4, the vertical portion 66 of the air deflection member 62 is generally aligned with an outer wall 106 of the door post 34 such that an outer surface 108 of the door post 34 is generally aligned with the outer surface 72 of the fairing 30. The curved portion 68 of the fairing 30 curves inwardly toward a longitudinal centerline (not shown) of the trailer 10. As shown in FIG. 5, the curved portion 68 of the fairing 30 generally defines the same or similar height and curvature of the hinge butt 48 such that the overall profile of the rear end assembly 20 of the trailer 10 (when viewed from above) remains unchanged with the addition of the fairings 30. In other words, each fairing 30 is configured to be located within the profile of the hinges 46 of the rear swing door 40. As such, a rearmost end portion of the fairing 30 is substantially aligned with a rearmost end portion of the hinges 46 and does not generally extend beyond the rearmost end portion of the hinges 46. However, an alternative fairing 130 may be provided, as shown in phantom in FIG. 5, which does not define the same height, or rearward projection, as the hinge butt 48. The illustrative fairing 130 is longer and thus defines a longer vertical portion 166. The curved portion 68 of the fairing 130 generally defines the same or similar radius of curvature as that of the fairings 30.

As shown in FIGS. 1 and 6, each fairing 30 is coupled to the door post 30 as a location between spaced-apart hinge butts 48. Further, illustratively, each fairing 30 generally defines a length, L, that is the same as or slightly smaller than a distance between the hinge butts 48 such that each fairing 30 operates to fill the space between the hinge butts 48 of the rear end assembly 20. It should be understood that while the fairings 30 are sized to define a length, L, in order to be positioned between the hinge butts 48 of the rear end assembly 20, it is within the scope of this disclosure for the fairings 30 to define any suitable length in order to fit appropriately between hinge butts 48 of other trailers which are spaced a different distance apart. In other words, the fairings 30 may define any suitable length in order to accommodate rear swing door assemblies having hinge butts which are spaced any distance apart from each other.

In operation, the fairings 30 control and smooth the air flowing at the rear end of the trailer 10 in order to decrease the drag on the trailer 10 when the trailer 10 is traveling down the highway. The fairings 30 do not interfere with the normal operation of the door panels 42 as the door panels 42 are moved between fully-opened and fully-closed positions. That is, because the fairings 30 are sized to fit within the profile of the hinge butts 48, the fairings 30 are not impacted by the door panels 42 as the door panels 42 are moved between the fully-opened and fully-closed positions. Further, the alternative fairing 130 shown in phantom in FIG. 5, which extends beyond the profile of the hinge butts 48, also does not interfere with the normal operation of the door panels 42. In other words, the alternative fairings 130 also do not prevent the door panels 42 from being able to be moved to the fully-opened position. Thus, the operator of the trailer 10 does not need to move the fairings 30, 130 between any use or stowed positions in order to properly operate the door panels 42 of the door 40. It should be understood that while the fairings 30, 130 are shown for use with a swing door 40 having swing door panels 42, it is within the scope of this disclosure to use the fairings 30, 130 with a trailer having an overhead door as well.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A rear fairing system for reducing drag on a trailer having a rear swing door, comprising:

a fairing configured to be coupled to a rear, vertical door post of the trailer, wherein the fairing includes (i) a mounting member configured to lie adjacent to and engaged with a rearwardly-facing, outer surface of the vertical door post and (ii) an air deflection member coupled to the mounting member and including a vertical portion and a curved portion, wherein the mounting member is made of a first plastic and the curved portion of the air deflection member is made of a second plastic.

2. The rear fairing system of claim 1, wherein the vertical portion is configured to extend rearwardly and the curved portion is configured to curve inwardly toward a longitudinal centerline of the trailer.

3. The rear fairing system of claim 1, wherein the fairing is made of plastic.

4. The rear fairing system of claim 3, wherein the fairing is made of a dual durometer plastic.

5. The rear fairing system of claim 1, wherein the first plastic is less flexible than the second plastic.

6. The rear fairing system of claim 1, further including a plurality of fairings configured to be coupled to the rear, vertical door post of the trailer.

7. The rear fairing system of claim 6, wherein each fairing is configured to be positioned between a pair of hinge butts of the trailer that are coupled to the vertical door post of the trailer and to a swing door panel of the swing door of the trailer.

8. The rear fairing system of claim 7, wherein a profile of the air deflection member of the fairing is configured to be substantially similar to an outer surface of the profile of the hinge butt.

9. The rear fairing system of claim 7, wherein the air deflection member of the fairing is configured to extend rearwardly beyond a rearward edge of the hinge butt.

10. The rear fairing system of claim 1, wherein the fairing is riveted to the door post.

11. The rear fairing system of claim 1, further comprising an adhesive coupled to an outer surface of the mounting member in order to bond the fairing to the door post.

12. The rear fairing system of claim 1, wherein an outer surface of the air deflection member of the fairing is configured to be generally aligned with an outer surface of the door post.

13. A rear fairing system for reducing drag on a trailer having a rear swing door, comprising:

a fairing configured to be coupled to a rear, vertical door post of the trailer, wherein the fairing includes (i) a mounting member configured to lie adjacent to and engaged with a rearwardly-facing, outer surface of the vertical door post and (ii) an air deflection member coupled to the mounting member and including a vertical portion and a curved portion, wherein the fairing further includes an overhang member coupled to the mounting member and the air deflection member, wherein the overhang member is configured to lie adjacent to and engaged with a curved outer edge of the rear, vertical door post, and wherein the overhang member extends forwardly from the mounting member and the air deflection member.

14. A rear fairing system for reducing drag on a trailer having a rear swing door, comprising:

a plurality of fairings configured to be coupled to the rear, vertical door post of the trailer, wherein each fairing is spaced vertically apart from each other fairing, wherein each fairing is configured to be located within the profile of the rear swing door and operates to substantially fill a gap between spaced-apart hinges of the rear swing door.

15. The rear fairing system of claim 14, wherein each fairing includes (i) a mounting member configured to lie adjacent to and engaged with a rearwardly-facing, outer surface of the vertical door post, and (ii) a J-shaped air deflection member coupled to the mounting member and configured to extend rearwardly therefrom.

16. The rear fairing system of claim 15, wherein a rearward end portion of each air deflection member curves inwardly toward a longitudinal centerline of the trailer.

17. The rear fairing system of claim 14, wherein a length of the fairing is substantially equivalent to a distance between adjacent, spaced-apart hinges of the rear swing door.

18. A rear end assembly of a trailer, comprising a rear frame;

a swing door coupled to the rear frame, the swing door including a swing door panel and a plurality of spaced-apart hinges coupled to a rear, vertical door post of the rear frame and the swing door panel; and a fairing coupled to the rear, vertical door post at a location between adjacent and spaced-apart hinges in order to substantially fill a gap between the spaced-apart hinges, wherein a rearmost end of the fairing is substantially aligned with a rearmost end of the hinges.

19. A rear fairing system for reducing drag on a trailer having a rear swing door, comprising:

a plurality of fairings each configured to be coupled to a rear, vertical door post of the trailer, wherein each fairing includes (i) a mounting member configured to lie adjacent to and engaged with a rearwardly-facing, outer surface of the vertical door post and (ii) an air deflection member coupled to the mounting member and including a vertical portion and a curved portion, wherein each fairing is configured to be positioned between a pair of hinge butts of the trailer that are coupled to the vertical door post of the trailer and to a swing door panel of the swing door of the trailer.

* * * * *